Patented May 17, 1949

2,470,491

UNITED STATES PATENT OFFICE 2,470,491

PROCESS FOR PURIFICATION OF PTEROYLGLUTAMIC ACID

Brian L. Hutchings, Pearl River, N. Y., assignor to American Cyanamid Company, New York, N. Y., a corporation of Maine No Drawing. Application December 12, 1946, Serial No. 715,637

6 Claims. (Cl. 260—251)

This invention relates to a process of purifying pteroylglutamic acid and related compounds.

Pteroylglutamic acid is a chemical reaction product having the more exact name N-[4-{-[(2-amino-4-hydroxy-6-pyrimido[4,5-b]pyrazyl)-methyl] amino}benzoyl] glutamic acid. This product is a growth promoting material having vitamin like properties and appears to be analogous to or identical with naturally occurring folic acid. The product is now being manufactured and supplied to the medical profession in large quantities. It is used to stimulate hemoglobin formation and in the treatment of agranulocytosis, sprue, and other related diseases.

Several methods of producing pteroylglutamic acid have been developed. For the most part these processes involve the simultaneous reaction of 2,4,5-triamino-6-hydroxy pyrimidine, p-aminobenzoylglutamic acid, and an appropriate three carbon compound having reactive aldehyde and/or halogen groups such as alpha, beta-dibromopropionaldehyde. Related products having vitamin and anti-vitamin like properties are prepared by analogous processes using other amides of p-aminobenzoic acid.

Pteroylglutamic acid has a highly complex molecule. Likewise the process by which it is formed is complex. As will be apparent from the nature of the different intermediates employed in its synthesis, numerous side reactions occur along with or following the principal reaction. Accordingly, the crude reaction product usually contains a relatively large number and proportion of undesired substances including unreacted intermediates, condensation and/or polymerization products, position isomers, oxidation products, and various other products of hydrolysis and degradation. Many of these contain a pyrimidopyrazine nucleus and possess some of the same solubility and other physical and chemical characteristics of the desired pteroylglutamic acid. Inasmuch as the pteroylglutamic acid is used as a therapeutic agent, it is desirable that the biologically inactive pterins which are formed in the reaction mixture be separated.

Although several processes of separating pteroylglutamic acid from related pterins which occur in the crude chemical reaction mixture have been developed, these methods are for the most part expensive or highly involved processes requiring exact manipulations in order to achieve even a reasonable recovery of the valuable pteroylglutamic acid. By the present process, however, I have made it possible to separate pteroylglutamic acid from related pterins with relative ease and with fairly good efficiency. This new process is easily adaptable to commercial plant production.

The new process of the present invention is dependent in a large measure upon the relative solubilities or insolubilities of the zinc salts of the various pterins which occur in the crude chemical reaction mixture. For example, the zinc salts of some pterins are relatively insoluble at a pH of 10.5 to 11.2, whereas the zinc salt of pteroylglutamic acid is moderately soluble at these hydrogen ion concentrations. On the other hand, at pH levels of about 6.5 to 7.0 the zinc salt of pteroylglutamic acid is relatively insoluble, whereas other pterins are more water soluble at these pH levels. By taking careful advantage of these conditions, it is possible to make substantial progress in the purification of crude reaction mixtures containing pteroylglutamic acid and related pterins.

In its broader aspects my process involves preparation of the zinc salts of the various pterins, including pteroylglutamic acid, which may be present, preferably by adding an acidic zinc salt to a solution of pterins in an alkali. This solution is adjusted to a hydrogen ion concentration of about pH 10.5 to pH 11.2, usually by adding the acidic zinc salt. After adjustment of the hydrogen ion concentration to within the range, the solution is filtered or centrifuged to remove the insoluble zinc pterins. This precipitation may take place either while the solution is hot or cold.

The pH of the solution is then reduced to within the range of about 6.5 to 7.0 with additional amounts of an acidic zinc salt or by the addition of acid. Under these conditions the zinc salt of pteroylglutamic acid has a minimum solubility and precipitates from solution. Other zinc salts and compounds remain in solution.

An additional peculiarity in the action of the zinc pteroylglutamate is that its solubility increases but slightly, if at all, with an increase in temperature. On the other hand, the solubility of other pterins in the solution tends to increase with a rise in temperature. It is preferred, therefore, but not necessary, that the precipitation of zinc pteroylglutamate take place at an elevated temperature, preferably from about 50° to 95° C.

While the precipitated zinc pteroylglutamate is of greatly increased purity, it is usually desirable to repeat the process until practically all of the impurities have been removed. To do this the zinc salt is dissolved in an aqueous solution of an alkali, sodium hydroxide, calcium hydroxide, barium hydroxide or the like, at a pH above about 11.5. The insoluble zinc hydroxide and other insoluble substances may then be removed by filtration, and the process just described repeated.

When it is considered that the purification has been carried far enough, treatment of the zinc salt with an acid to a pH below five, preferably at pH about 3, results in precipitation of the free pteroylglutamic acid. The product may be separated from its mother liquor and dried or made up into pharmaceutical products of various kinds.

Although the new process is particularly useful in the purification of pteroylglutamic acid, I have found that it is also useful in separating other related products such as pteroyldiglutamylglutamic acid and other amino acid amides of pteroic acid from their crude chemical reaction mixtures.

The following is a general description of the process.

Crude pteroylglutamic acid containing a mixture of unidentified pterines and other products of the synthesis is treated in water at a temperature of between about 25° C. to 75° C. with two to three times, or more, by weight of the amount of pteroylglutamic acid in the crude mixture of calcium hydroxide or barium hydroxide at a concentration of from about 0.2 to 3.0 g. of real pteroylglutamic acid per liter. The pH of the solution should be from about 11.5 to 12.1 or slightly higher. The solution is then filtered to remove some of the insoluble impurities.

A solution of zinc chloride, zinc sulfate, zinc acetate, or other soluble acidic zinc salt, is then added to the filtrate to reduce the pH to within the range of about 10.5 to 11.2. The amount of zinc salt that is added should be carefully governed in that at a pH below about 10.5 much of the pteroylglutamic acid is lost, whereas at a pH in excess of 11.2 not enough of the impurities are removed.

The solution is then filtered to remove most of the insoluble pigments which are precipitated as a result of the zinc salt treatment. A clear yellow solution is obtained containing from 65 to 90% of the original pteroylglutamic acid.

The filtered solution is warmed to within the range 50° to 95° C. and is again treated with the zinc salt or with an acid to lower the pH to within the range of about 6.5 to 7.0, from which solution the zinc salt of pteroylglutamic acid is precipitated.

The precipitated zinc salt is further purified, as may be necessary, by redissolving in water with sodium hydroxide, sodium carbonate, calcium hydroxide, barium hydroxide, or other alkali and again precipitating as the zinc salt by the process just described. Under some conditions as many as five or more zinc salt preciptations may be necessary to remove all of the impurities associated with the crude pteroylglutamic acid reaction product.

The final zinc salt is dissolved in calcium or barium hydroxide solution and clarified to remove insoluble zince compounds. The zinc chloride solution is then added to reduce the pH to between 9.5 and 11.0 to remove last traces of the red pigments, after which the solution is then filtered and treated with an acid to precipitate pteroylglutamic acid in a degree of purity sufficient for most of its uses.

The following examples will illustrate in still greater detail the process of the present invention.

*Example 1*

Crude pteroylglutamic acid resulting from the reaction of 2,4,5-triamino-6-hydroxypyrimidine, alpha, beta-dibromopropionaldehyde and p-aminobenzoylglutamic acid is dissolved in water with lime at 60° C. at a concentration of 1 g. of real pteroylglutamic acid per liter at a pH between 11.5 and 12.1. The solution is then filtered to remove insoluble calcium salts of some of the impurities.

A 20% zinc chloride solution is added to the filtrate to reduce the pH to 10.6–10.8 and the solution is again filtered to obtain a clear yellow solution containing most of the original pteroylglutamic acid.

The solution of the zinc salt of pteroylglutamic acid is then treated with more of the zinc chloride solution at a temperature of 80° C. to reduce the pH to 6.8 at which the zinc salt precipitates from the solution.

The precipitated zinc salt is redissolved with lime in water and the process just described is repeated five times. The final solution of the zinc salt at a pH of 10.6 to 10.8 is then treated with sulfuric acid to a pH of about 3 to percipitate pteroylglutamic acid of 85 to 90% purity.

*Example 2*

250 g. of crude pteroylglutamic acid containing approximately 25% of the real acid and the remainder pterins of unidentified composition and other products is dissolved in 275 pounds of water and 2.2 pounds of sodium hydroxide at about 30° C. Then 6.7 pounds of barium chloride as the dihydrate is added and 39 pounds of ethyl alcohol. The charge is stirred one hour, then filtered to give 325 pounds of filtrate. This solution contains about 60 g. of real pteroylglutamic acid and about 100 g. of the unidentified pterins.

One quarter of the above solution, at about 30° C., is diluted to 405 pounds with water and adjusted to a pH of 7.0 with hydrochloric acid. Then 3 pounds of Hyflo Supercel is added and the charge is clarified.

The solution above is treated with ½ pound of zinc acetate and then adjusted to pH 6.8 with hydrochloric acid and/or sodium hydroxide, as necessary. One pound of Hyflo Supercel is added and the precipitate collected on the filter. The filtrate contains less than 5 gammas/ml. of pteroylglutamic acid and 17.6 g. of the pterins.

The precipitate from the above procedure is slurried in 400 pounds of water and 724 g. of flake caustic. The precipitated zinc hydroxide and Hyflo is removed by filtration. The filtrate is then adjusted to a pH of 7.0 with hydrochloric acid and ½ pound of zinc acetate is added. The solution is again readjusted to a pH of 6.8 and the precipitate collected on the filter.

The zinc pteroylglutamate thus obtained is dissolved in 60 pounds of water and 120 g. of sodium hydroxide. The solution is then treated with about 5 g. of activated charcoal and is filtered. The treatment with activated charcoal is then repeated.

The filtrate from the above treatment is adjusted to a pH of 3.0 with hydrochloric acid, heated to 80° C. to dissolve the precipitate, clarified while hot, and cooled to 40° C. The yellow precipitate obtained is relatively pure pteroylglutamic acid.

*Example 3*

Three grams of real pteroylglutamic acid as 100 grams of wet crude material is slurried in a little water to a smooth paste and then diluted to 2000 cc. It is treated with 40 cc. of 5 normal sodium hydroxide solution, warmed to 50° C., and then diluted further to 3400 cc.

To this solution is added with vigorous stirring 14 grams of calcium chloride in the form of a 15% aqueous solution to give no change in the pH 11.7. The dark precipitate is removed by filtration and washed on the filter with cold water.

The filtrate is then treated with a 10% aqueous zinc chloride solution to pH 10.8, 20 grams of filter aid (Hyflo Supercel) is added, and the dark precipitate is removed by filtration.

The light yellow colored filtrate is treated with a 10% aqueous solution of lead nitrate to pH 6.8. After the addition of 40 grams of filter aid the solution is heated to 80° C. and filtered hot.

The wet cake is slurried in 1 liter of water and treated with dilute sodium hydroxide to a faint pink spot on Benzoazurine test paper, then diluted to 3 liters and treated with lead nitrate solution to pH 7.5. It is then heated to 80° C. and the insolubles removed by filtration.

The procedure described in the preceding paragraph is applied three times more to the filter cake, until the neutral pterins in the filtrate are less than 15 gammas/ml.

After the last treatment the wet cake is slurried in 1.5 liters of 0.1 N sodium hydroxide solution and the insolubles removed by filtration. After the addition of 20 grams of filter aid the filtrate is adjusted to pH 3.2 with hydrochloric acid. The precipitate is collected on the filter, together with the filter aid. This cake is then treated with an excess of lime in 1500 cc. water, and filtered. The filtrate is heated to 85° C. and acidified to pH 3 to 4 with acetic acid. The pteroylglutamic acid precipitates and after cooling is collected on the filter, washed with water and alcohol and dried. The yield is 1.4 grams of material of 86.5% purity.

I claim:

1. A process of separating the zinc salt of pteroylglutamic acid from related pterins which comprises the steps of preparing a solution of a soluble zinc salt and pteroylglutamic acid at a hydrogen ion concentration within the range pH 10.5 to pH 11.2 and separating the soluble substance from the insoluble matter, adjusting the pH of the solution to within the range 6.5 to 7.0 and separating insoluble zinc pteroylglutamate therefrom.

2. A process of preparing the zinc salt of pteroylglutamic acid which comprises the steps of adding an acidic zinc salt to an alkaline solution of pteroylglutamic acid until the pH has been reduced to within the range 10.5 to 11.2, removing insoluble matter, adjusting the pH of the solution to within the range 6.5 to 7.0 by the addition of an acidic zinc salt, and separating from the solution the insoluble zinc pteroylglutamate which forms.

3. A process of purifying pteroylglutamic acid which comprises the steps of dissolving crude pteroylglutamic acid in an alkaline solution at a pH above about 11.5, adding an acidic zinc salt to the alkaline solution until the pH has been reduced to within the range 10.5 to 11.2, removing insoluble matter, adding an acidic zinc salt until the pH is within the range 6.5 to 7.0, separating from the solution the insoluble zinc pteroylglutamate which forms, dissolving the zinc pteroylglutamate in alkaline solution to a pH above about 11.5, and repeating the treatment with the acidic zinc salt.

4. A process of purifying pteroylglutamic acid which comprises the steps of dissolving a crude reaction product containing pteroylglutamic acid in an aqueous solution of an alkaline earth metal hydroxide at a pH above about 11.5, separating insoluble matter from the solution, adjusting the pH of the solution to within the range 10.5 to 11.2 with zinc chloride, removing insoluble matter, adjusting the pH of the solution to within the range 6.5 to 7.0 by the addition of zinc chloride, removing the insoluble zinc pteroylglutamate which forms, dissolving the zinc pteroylglutamate in alkaline solution, separating the insoluble matter, adjusting the pH of the solution to about 3.0 and recovering therefrom insoluble pteroylglutamic acid.

5. A process of purifying pteroylglutamic acid which comprises the steps of dissolving impure pteroylglutamic acid in an alkaline solution at a pH above about 11.5, adding an acidic zinc salt to the alkaline solution until the pH has been reduced to within the range 10.5 to 11.2, removing insoluble matter, adding an acidic zinc salt to the solution at a temperature of from about 50° to 95° C. until the pH is within the range 6.5 to 7.0, and recovering the precipitate of zinc pteroylglutamate which forms.

6. A process of purifying pteroylglutamic acid which comprises the steps of dissolving impure pteroylglutamic acid in an alkaline solution at a pH above about 11.5, adding an acidic zinc salt to the alkaline solution until the pH has been reduced to within the range 10.5 to 11.2, removing insoluble matter, warming the clear solution to within the range 50° to 95° C., adjusting the pH to within the range 6.5 to 7.0 and recovering the precipitate of zinc pteroylglutamate which forms.

BRIAN L. HUTCHINGS.

No references cited.